United States Patent [19]

Hammond et al.

[11] Patent Number: 4,575,811

[45] Date of Patent: Mar. 11, 1986

[54] VECTOR SUMMATION POWER AMPLIFIER

[75] Inventors: Russell E. Hammond; John L. Henry, both of San Diego, Calif.

[73] Assignee: The United States of America as represented by the Secretary of the Navy, Washington, D.C.

[21] Appl. No.: 390,096

[22] Filed: Jun. 21, 1982

[51] Int. Cl.[4] .......................... G06J 1/00; G06F 1/02

[52] U.S. Cl. .................................. 364/607; 364/721; 307/315

[58] Field of Search ....................... 364/600, 602-603, 364/607-608, 718-721; 307/200 R, 315; 328/13, 34, 142; 340/347 DA, 347 DD

[56] References Cited

U.S. PATENT DOCUMENTS

| | | | |
|---|---|---|---|
| 3,648,037 | 3/1972 | Tew, Jr. | 364/718 X |
| 3,731,300 | 5/1973 | Greutman et al. | 340/347 DA |
| 3,793,589 | 2/1974 | Puckette | 364/608 X |
| 3,983,495 | 9/1976 | Epstein | 328/34 |
| 3,995,222 | 11/1976 | Mitarai | 328/13 X |
| 4,160,245 | 7/1979 | Scott | 340/347 DA X |
| 4,172,286 | 10/1979 | Wess | 364/721 |
| 4,346,448 | 8/1982 | Insam et al. | 364/607 |
| 4,368,432 | 1/1983 | Levy | 364/721 X |
| 4,404,478 | 9/1983 | Rischmüller | 307/315 |

*Primary Examiner*—Gary V. Harkcom

*Attorney, Agent, or Firm*—R. F. Beers; Ervin F. Johnston; Harvey Fendelman

[57] ABSTRACT

A time sequence of square waves is summed to provide minimum distortion high power voltage sinusoids. The phase difference of two identical sinusoids is varied to control the resultant summed amplitude. Amplitude modulation of the sum sinusoid is achieved through varying the phase relationship between the two identical sinusoids. Frequency and phase modulation is achieved through digital control of the individual square waves.

29 Claims, 11 Drawing Figures

EXAMPLE

| STEP VOLTAGE NUMBER | TURN ON (DEG) | TURN OFF (DEG) |
|---|---|---|
| 1 | 3.6 | 110.4 |
| 2 | 10.8 | 125.7 |
| 3 | 18.2 | 136.6 |
| 4 | 25.9 | 145.8 |
| 5 | 34.2 | 154.1 |
| 6 | 43.4 | 161.8 |
| 7 | 54.3 | 169.2 |
| 8 | 69.5 | 176.4 |

VECTOR SUMMATION POWER AMPLIFIER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of power amplifiers and to sine wave generators and, more particularly, to the field of high power radio transmitters and to very low frequency (VLF) transmitters.

For instance, the United States Navy operates strategic VLF (15–30 Khz) communication stations which transmit megawatts of power. These stations are now relatively outdated, inefficient, and costly to maintain. Motivation exists to replace these stations with a more efficient and less costly to maintain technology.

The field of solid state power conversion has become quite active in the last several years because of improved components, improved circuits, and new methods of modeling and analysis. Several techniques in this field are applicable to VLF applications. First, it is recognized that a switching mode amplifier configuration can be derived for every switching mode power conversion configuration. These configurations can be divided into those that require only one on-off transition per switch for a given frequency and those that require more than one. The latter suffer from the disadvantage of power losses which are directly related to the number of on-off transitions of the power switch. The single transition circuits include the conventional class D push-pull amplifier, resonant converters and vector summation converters. Resonant converters have the problem of difficulty in changing frequencies. Vector summation converters have an advantage over the class D configuration due to their potential ability to eliminate the need for regulating input power, their ease of accommodating any type of modulation, and their potential for reducing or eliminating output resonant circuitry.

SUMMARY OF THE INVENTION

The method and apparatus of the present invention are based upon the series connection of the secondary windings of a number of bridge driven power transformers. The output of each transformer is a square wave whose value is either +V, −V, or 0. Each transformer's square wave is slightly out of phase with the others although the duty ratio is approximately the same for all. The resultant voltage across the series connection of the secondary windings of the power transformers is a minimum harmonic distortion step sinusoidal waveform as is illustrated in FIG. 1. Again, this waveform is the series sum of the secondaries of eight transformers, in the present example,it being understood that other numbers of the transformers could be used. It is also to be understood at this point that the chart indicating turn-on and turn-off times, in degrees, in FIG. 1 is illustrated by way of example only and that other turn-on and turn-off degrees may be utilized in accordance with the present invention. It is noted that the turn-on and turn-off times of each step of the sinusoidal waveform illustrated in FIG. 1 may be determined by Fourier analysis for minimum harmonic distortion. Other more arbitrary turn-on and turn-off times may be utilized, however, within the scope of the present invention. It is also noted that as each bridge's step contribution is the same magnitude, i. e., +V or −V, it is possible to ensure that each of the square waves is also of approximately the same duration. The situation in which the individual square waves have a longer duration at the base of the sinusoid and progressively shorter durations towards the peak should be avoided to prevent distortion and to equalize power processing. Instead of doing this, in accordance with the present invention, it is possible to obtain the same resultant voltage waveform by turning off the first bridge to be turned on at the first down step of the sine wave or point 1 of FIG. 1.

The second square wave is turned off at the second down step 2 of the output sinusoid and so on. This method of sinusoid generation results in a range of individual positive and negative on-time duty ratios of 28% to 32%.

In accordance with the present invention a second identical sinusoid is constructed and summed with the first sinusoid. The amplitude resultant of this vector summation sinusoid is controlled by varying the phase difference of the two identical sinusoids.

In accordance with one embodiment of the present invention, in order to maintain a constant amplitude output of the resultant sinusoid, a feedback loop is utilized in order to compare the amplitude of the resultant sinusoid with that of a fixed reference. Thus, in accordance with the present invention an error signal is developed which represents the difference between the fixed reference value and the amplitude of the output sum sinusoid. This error signal is utilized to calculate a phase angle correction amount. The phase angle correction amount is subsequently utilized to adjust the relative phase shift between the two components sinusoids at a predetermined time. Further, if amplitude modulation of the output sum sinusoid is desired, in accordance with the present invention, signals may be generated to selectively vary the relative phase shift between the component's sinusoids to thereby achieve phase or amplitude modulation of the sum sinusoid. Frequency modulation may also be achieved in accordance with the present invention by selectively varying the frequency of the clock signal generator which is utilized to drive the digital logic components of the vector summation power amplifier of the present invention.

In accordance with the present invention, modulation of the output sinusoid is obtained by modulating the clock and logic commands, or for amplitude modulation, slewing the sine wave vectors.

The vector summation power amplifier of the present invention has the ability to handle any power factor load from full leading to full lagging making it tolerant of detuned antenna matching networks. The present invention also has the advantage of ease in reliably adding transistors to increase the power, ease in protecting the power transistors, and exhibits a graceful degradation mode under failure conditions.

OBJECTS OF THE INVENTION

Accordingly, it is the primary object of the present invention to disclose a novel method and network for digitally controlling the amplitude and phase of a sinusoidal wave.

It is an concomitant object of the present invention to disclose a novel sinusoid wave generator.

It is a further object of the present invention to disclose a novel technique of utilizing square wave addition to achieve equal duty ratio of power bridge switching transistors.

It is a further object of the present invention to disclose a novel method and apparatus of prohibiting "shoot-through" in power bridge switching devices.

It is another object of the present invention to disclose a novel time delay circuit.

It is a still further object of the present invention to disclose a novel feedback control circuit for maintaining the amplitude and phase of a sinusoidal waveform relatively constant.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
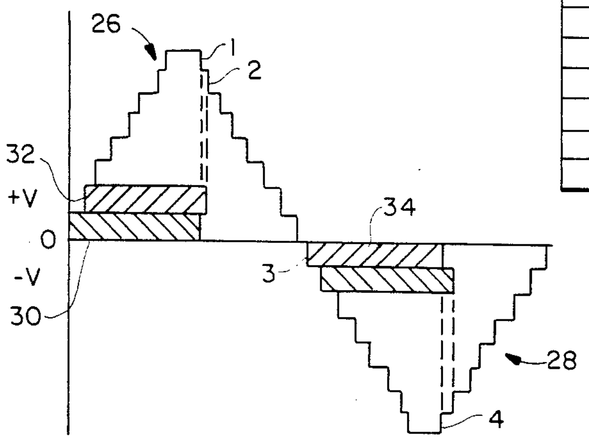
FIG. 1 PRIOR ART
FIG. 1 is a graph of the sine wave construction of the present invention illustrating by way of example turn-on and turn-off phase angles.
Figure 2:
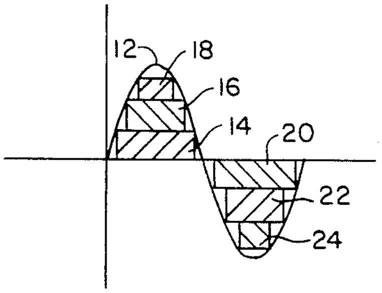
FIG. 2 is a graph of a prior art technique of forming a sinusoidal wave by the addition of square waves.

It is well known that a sinusoidal waveform can be approximated by the superposition or addition of square waves. Referring to FIG. 2 there is illustrated a sinusoidal waveform 12 which is approximated by the addition of the rectangular pulses 14, 16 and 18 for the positive half of the sinusoid and, likewise, the negative half of the sinusoidal waveform 12 is approximated by the addition of the square wave pulses 20, 22 and 24. It can be seen in FIG. 2 that the individual square waves 14 and 20 at the base of the sinusoid have a longer duration than the rectangular pulses 16, 18, 22 and 24 and that the pulses have progressively shorter durations toward the peak of the sinusoid 12. In accordance with the present invention, it is possible to obtain the same resultant voltage waveform by turning off the first rectangular pulse to be turned on at the first down step of the sinusoid. Referring to FIG. 1, this concept is illustrated.

Referring to FIG. 1 there is seen a stepped sinusoidal waveform having a positive portion 26 and a negative portion 28. It can be seen that the positive and negative halves 26 and 28 of the sinusoid 26 and 28, respectively, are each formed by the addition, in the present example, of eight distinct rectangular pulses. It can also be seen in FIG. 1 that the first voltage rectangular pulse 30 which constitutes the first step up voltage of the sinusoidal positive half 26 also constitutes the first down step of the positive half 26 of the sinusoid as indicated at point 1. Similarly, the second positive voltage pulse 32 gives rise to the second down step as indicated at point 2 in FIG. 1. The negative half 28 of the sinusoid is similarly constructed such that the pulse 34 giving rise to the first down step at point 3 in FIG. 1 is the pulse that forms the first up step as indicated at point 4 in FIG. 1. Thus it is seen that the first rectangular pulse to be turned on is the first pulse to be turned off at the first down step of the sine wave 26 and the second rectangular pulse is turned off at the second down step of the output sinusoid and so on. It is to be understood at this point that although the concept of the present invention has been illustrated in FIG. 1 with respect to a stepped sinusoidal waveform formed from eight positive and eight negative rectangular pusles, a greater or lesser number of rectangular pulses may be utilized depending upon the particular application.

Figure 3A:
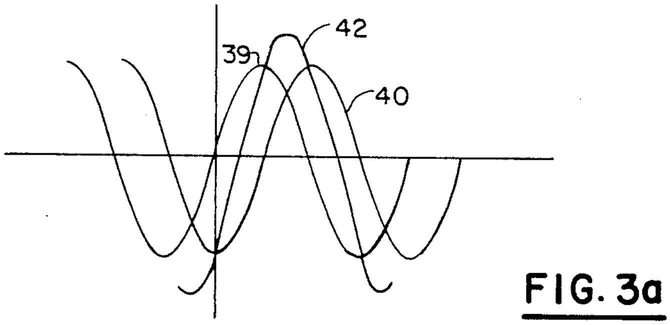
FIG. 3*a* is a graph illustrating the manner in which two sinusoidal waveforms may be added together to achieve a sum or resultant waveform and further illustrating how phase shifting the component waveform may result in amplitude modulating the resultant waveform.
Figure 3:
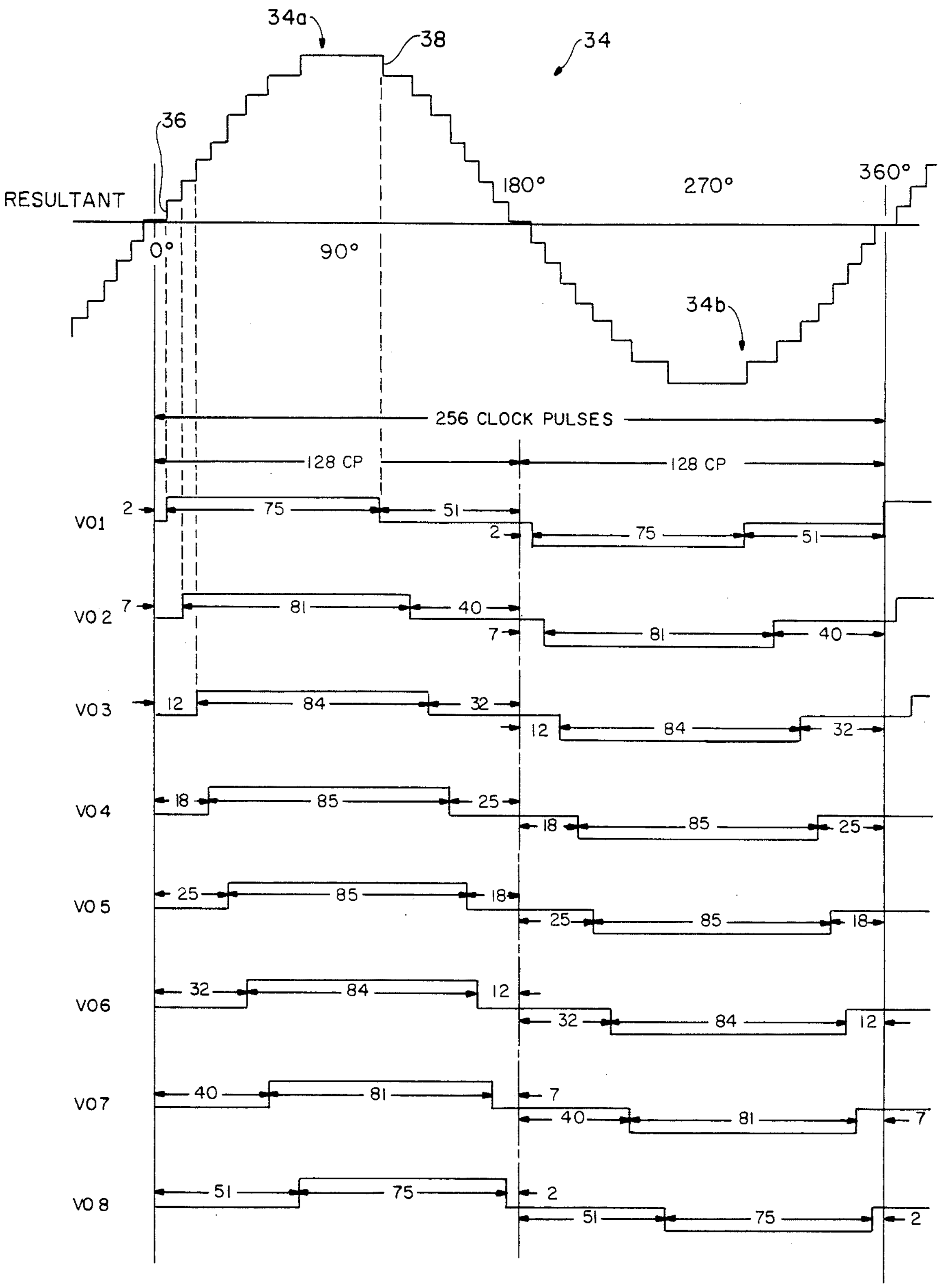
FIG. 3 is a graph and corresponding timing diagram illustrating the manner in which the square waves are timed to achieve the resultant sinusoid in accordance with the present invention.

Referring to FIG. 3 there is illustrated a stepped sinusoidal voltage waveform 34 having a positive half **34*a* and a negative half 34*b*. Below waveform 34 there are illustrated eight rectangular pulse voltage waveforms V01, V02, V03, V04, V05, V06, V07 and V08. Each of the rectangular pulse sequences V01 through V08, inclusive, includes a positive voltage pulse followed by a time delay and a negative voltage pulse of approximately equal duration. It is also noted in FIG. 3 that each of the positive and negative rectangular voltage pulses V01 through V08 has an approximately but not exactly equal duration. Referring to FIG. 3, it can also be seen that, in the present example, the rectangular pulse sequences V01 through V08 each have a total duration of 256 clock pulses. This again is by way of example only, it being understood that other numbers of clock pulses could be utilized depending upon the particular application. As is illustrated in FIG. 3, it can be seen that each successive pulse sequence V01 through V08 has a slightly greater phase shift than the preceding pulse sequence with respect to a reference. Thus, for example, the leading edge of the positive pulse of pulse sequence V03 is delayed twelve clock pulses from the reference zero point and the leading edge of the positive pulse of pulse sequence V04 is delayed eighteen clock pulses from the zero reference. It should also be readily appreciated that the leading edge of the first positive rectangular pulse of pulse sequence V01 corresponds to the first up step 36 of sinusoid 34 and that the trailing edge of the first positive rectangular pulse of pulse sequence V01 corresponds to the first down step 38 of stepped sinusoid 34. It should also be readily appreciated that the addition of each of the pulse sequences V01 through V08, inclusive, gives rise to the stepped sinusoidal waveform 34**. The generation of pulse sequences such as V01 through V08 illustrated in FIG. 3 and the addition of those pulse sequences to result in a stepped sinusoidal waveform such as 34 in FIG. 3 is the concept upon which the present invention is based. It should also be noted at this point that although each of the positive rectangular pulses of the pulse sequences V01 through V08 are not exactly of equal duration, it is important that the negative pulse of each particular pulse sequence is of the same duration as the positive pulse of a particular pulse sequence. For instance, it is seen in FIG. 3 that the positive rectangular pulse of pulse sequence V01 is seventy-five clocks in duration and, likewise, the negative pulse of pulse sequence V01 is seventy-five clocks in duration. Similarly, the positive pulse of pulse sequence V02 is eighty-one clocks in duration and the negative pulse of pulse sequence V02 is eighty-one clocks in duration, etc. Since in the present invention these positive and negative rectangular pulses are generated across transistor power switching bridges, to be described, by ensuring that their positive rectangular pulses are of the same duration as the negative rectangular pulses of each particular pulse sequence, the transistor switching power bridges utilized will operate in a balanced mode such that current will flow through the load of each particular power bridge in both directions for an equal amount of time.

In order to facilitate an understanding of another aspect of the present invention, reference is now made to FIG. 3*a* wherein there are shown a first sinusoidal waveform 39 and a second sinusoidal waveform 40 of equal amplitude to 39 but slightly phase shifted. Also illustrated in FIG. 3*a* is a resultant sinusoid 42 which is derived by the addition of sine wave 39 to sine wave 40. It can be appreciated at this point that the amplitude of the sum or resultant sinusoid 42 is dependent upon the phase relationship between the component sinusoids 39 and 40. If, for instance, sinusoid 40 were exactly in phase with sinusoid 39, then the resultant sinusoid 42 would have a maximum amplitude of twice the component sinusoid's amplitude and it can also be appreciated that if the component sinusoid 40 were phase shifted so as to be 180° out of phase with component sinusoid 39, then the sum sinusoid 42 would have zero amplitude. It is thus demonstrated that sum sinusoid 42 may be amplitude modulated by selectively varying the phase relationship between the component sinusoids 39 and 40. It can also be appreciated at this point that varying the frequency of the component sinusoids 38 and 40 would result in a corresponding variation in frequency of the sum sinusoid 42 and therefore that by selectively varying the frequency of the component sinusoids 39 and 40, the sum sinusoid 42 may be frequency modulated. The generation of a sum sinusoid such as sinusoid 42 from component sinusoids such as sinusoids 39 and 40 and amplitude and/or frequency modulating the sum sinusoid by varying the phase relationship between the component sinusoids and/or varying the frequency of the component sinusoids, and/or maintaining a constant peak amplitude sum sinusoid by maintaining a specific phase relationship between the component sinusoids is what is accomplished by the hardware of the present invention to be described.

Figure 4A:
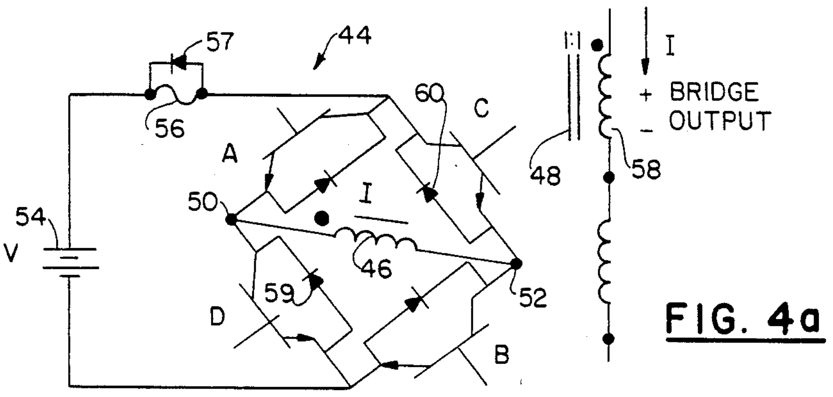
FIG. 4*a* is a schematic diagram of the transistor power bridge of the present invention.
Figure 4:
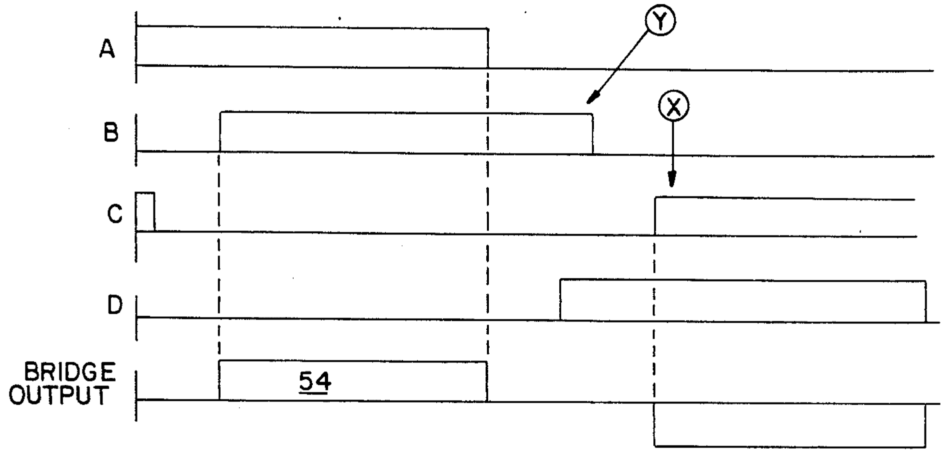
FIG. 4 is a timing diagram illustrating the relative relationship of the power bridge drive signals.

The basic bridge power circuitry utilized to generate each of the pulse sequences V01 through V08, inclusive, is illustrated in FIG. 4. It is understood that the basic bridge power circuit 44 illustrated in FIG. 4 may be utilized to generate one of the rectangular pulse sequences such as is illustrated in FIG. 3, e.g., V01, and that seven, in the present example, other basic bridge power circuits identical to that illustrated in FIG. 4 would be utilized to generate the remaining pulse sequences V02 through V08 as will be described. Referring now to FIG. 4, it is seen that the basic bridge power amplifier circuit 44 is comprised of four transistor switching arms A, B, C and D. It is to be understood that although the four arms A, B, C and D are illustrated as single transistors, such arms A, B, C and D are illustrated by way of representation only and are intended to represent only the output transistor of a transistor and base drive switching network to be described. The transistor switching arms A, B, C and D are connected in a bridge arrangement as illustrated with the primary winding 46 of a transformer 48 connected across the output terminals 50 and 52 of the bridge. Power is supplied to the transistor switching bridge 44 via voltage supply 54 through overcurrent protection fuse or circuit breaker 56 and parallel connected bridge failure shorting diode 59.

The transistor base drive signals and the bridge output waveform are illustrated in the timing diagram of FIG. 4. The transistor base drive diagrams illustrate the timing required to produce the bridge output waveform shown. When transistors A and B are conducting, the positive voltage step is produced, i.e., the positive voltage step 54 is produced during the concurrent period of conduction of transistors A and B. Transistor A turns off earlier than transistor B, ending the positive step. As transistor B is still on, the transformer's primary winding 46 is essentially shorted via transistor B and transistor D's snubber diode 56 for currents in the direction indicated. The energy stored in the leakage inductance of transformer 48 can be released without distortion. Also, secondary load current flowing from the series connected secondaries to be described will likewise be shorted in the primary of each transformer, to be described, thereby minimizing distortion. If the transformer 48 secondary winding 58 load current is opposite that shown in FIG. 4, a path for primary current flow exists between the snubber diodes 56 and 60 associated with transistors C and D and the voltage supply 54. The distortion induced in the secondary winding is essentially limited to the supply voltage V during this brief condition. In accordance with the present invention, approximately four microseconds, by way of example, after transistor A has been turned off, transistor D is turned on thus ensuring that transistors A and D do not simultaneously conduct to short the supply voltage 54. During this time, with transistors B and D on, the primary 46 is shorted and distortion is minimized. Similarly, four microseconds, in the present example, after transistor B turns off, transistor C is turned on and the negative pulse begins. The cycle repeats in a similar manner for the negative pulse. By timing the base drive signals of the bridge transistors A, B, C and D as indicated in the timing diagram of FIG. 4, it can be seen that bridge output pulses can be generated in the format of the rectangular pulse sequences V01 through V08 illustrated in FIG. 3.

By utilizing a plurality of transistor switching bridge networks identical to bridge network 44, each driving the primary winding of a transformer, and by connecting the secondary windings of all such transformers in series, it can thus be seen that a step sinusoidal waveform as illustrated in FIG. 3 would be generated across the series connected secondary windings of the transformers.

Keeping in mind the fact that a single transistor power switching bridge network such as 44 is utilized to generate a single rectangular pulse sequence such as V01 illustrated in FIG. 3, the apparatus in accordance with the present invention utilized to generate a stepped sinusoid such as sinusoid 34 illustrated in FIG. 3 by adding sequences of rectangular pulses such as V01 through V08 as illustrated in FIG. 3 will now be described with reference to FIG. 5. Also, the network in accordance with the present invention for generating a second component sinusoid identical to sinusoid 34 illustrated in FIG. 3 to achieve a sum of sinusoids such as, for example, sum sinusoid 42 illustrated in FIG. 3*a* will now be described.

Figure 5:
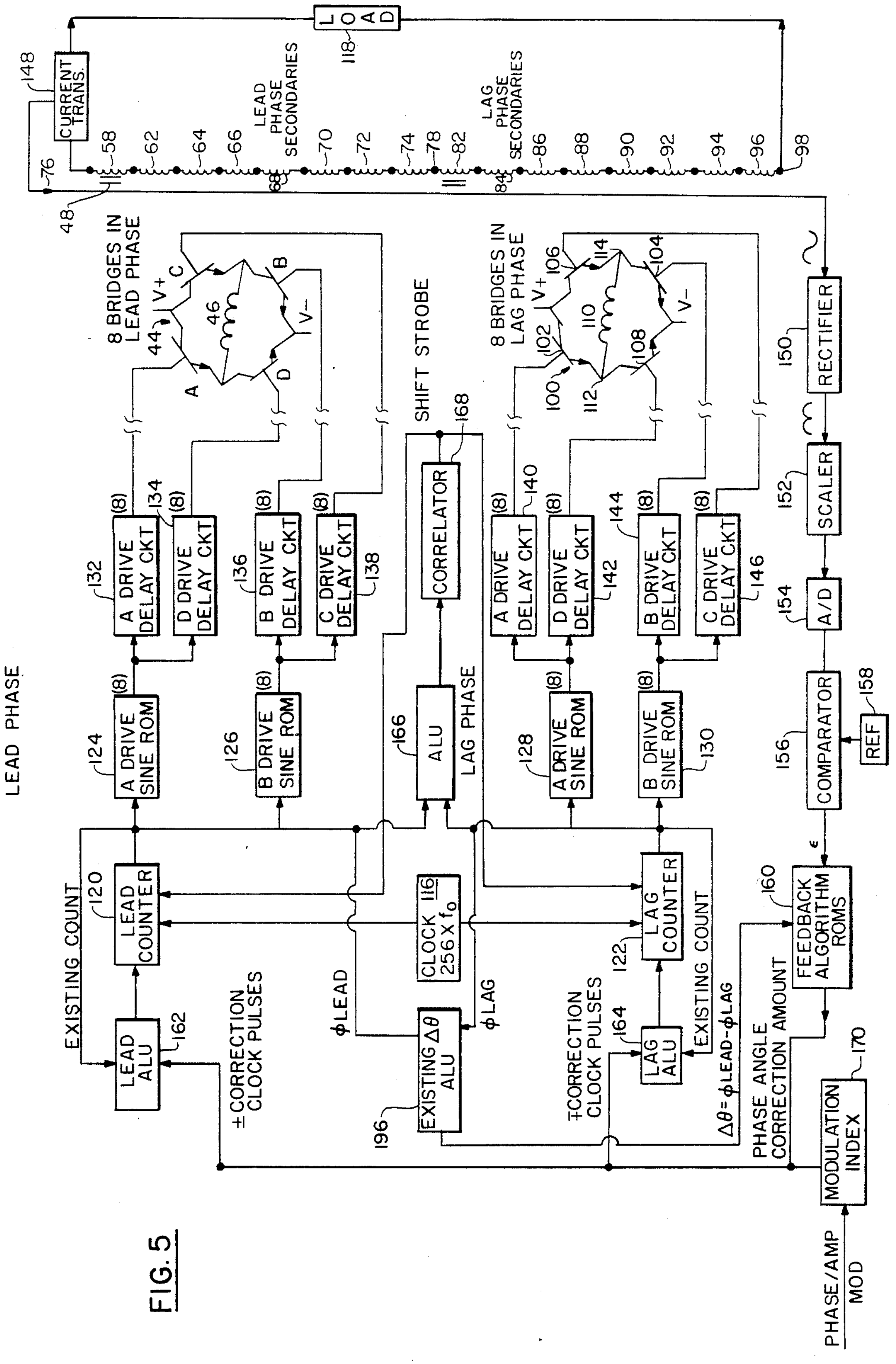
FIG. 5 is a schematic network block diagram of the overall system of the present invention.

The secondary winding 58 of power transformer 48 as illustrated in FIG. 5 is connected in a series chain of eight transformer secondary windings comprising what is referred to herein as the lead phase secondaries. In addition to transformer secondary 58 the lead phase transformer secondary windings include series connected windings 62, 64, 66, 68, 70, 72 and 74. For the sake of simplicity, the transistor power switching bridges which drive the primary windings of the transformers having output windings 62, 64, 66, 68, 70, 72 and 74 have not been illustrated. It is understood, however, that the circuitry utilized to generate the appropriately timed base drive signals for the switching transistors of the power bridges are substantially identical and are therefore not illustrated, the only difference between the circuitry not shown and that illustrated in FIG. 5 being that each base drive signal network associated with each of the eight transistor switching bridges has a different phase shift associated with its output waveform. This can be seen in FIG. 3 for rectangular pulse sequences V01 through V08, inclusive. It is also understood at this point that although the present invention is described as incorporating eight bridges in the lead phase and eight corresponding transformer secondaries, a greater or fewer number of bridge networks and corresponding transformer secondaries could be utilized depending upon the particular application.

For generation of a second stepped sinusoid substantially identical to the stepped sinusoidal voltage derived across terminal 76 and 78 for lead phase secondaries, eight lag phase transformer secondaries 82, 84, 86, 88, 90, 92, 94 and 96 are connected between the terminals 78 and 98 and are connected in series with the lead phase secondaries. There are, of course, a like number of lag phase secondary windings to the number of lead phase secondary windings. Lag phase transistor switching bridge 100, identical to switching bridge 44, is comprised of a four arm transistor switching bridge including transistors 102, 104, 106 and 108. A transformer primary winding 110 is connected across output terminals 112 and 114 of the transistor switching bridge 100 and has a secondary winding 82 connected in series with the remaining lag and lead phase secondaries as is illustrated. It is to be understood that there are, in the present example, a total of eight lag phase transistor switching bridges and associated drive networks, each having a transformer primary winding connected across its output terminals in a like manner to transformer primary winding 110, each of the transformers not shown having the secondary windings 84, 86, 88, 90, 92, 94 and 96 connected as illustrated and previously described. It is also understood at this point that each of the eight transistor switching bridge networks in the lead phase and each of the eight transistor switching bridges in the lag phase operates substantially identically to transistor switching bridge 44 previously illustrated and described.

The switch drive information for determining the turn-on and turn-off times of each of the transistor switches in the four arms of each of the sixteen transistor switching bridge networks illustrated in the present example is generated by the components now to be described.

A clock signal generator 116 generates a clock pulse train at a frequency of 256 times $f_o$ where $f_o$ is the desired output frequency to be produced across load 118. It is to be understood that other multiples of the frequency $f_o$ could be utilized depending upon the particular application. The clock pulse train output of clock signal generator 116 is furnished to lead counter 120 and likewise is simultaneously furnished to lag counter 122. Each power switching bridge in the lead phase as well as each power switching bridge in the lag phase such as 44 and 100, respectively, has associated with it two read-only-memories. Thus, lead counter 120 has its outputs connected to a first read-only-memory 124 illustrated as the A drive sine ROM and is also connected to a second read-only-memory 126 referred to as the B drive sine ROM. Likewise, the lag counter 122 in the lag phase has its outputs connected to a first read-only-memory 128 and a second read-only-memory 130 again referred to as the A drive sine ROM and the B drive sine ROM, respectively. Since in the present example there are eight transistor switching bridges utilized in each of the lead and lag phases, it should be understood at this point that there are eight A drive sine ROMs and eight B sine ROMs in the lead phase and, likewise, eight A drive sine ROMs and eight B drive sine ROMs in the lag phase. The output of each read-only-memory 124, 126, 128 and 130 is furnished as the input to two delay circuits as illustrated. More particularly, read-only-memory 124 is connected to the inputs of A drive delay circuit 132 and to D drive delay circuit 134. The read-only-memory 126 is connected to the input of the B drive delay circuit 136 and to the input of the C drive delay circuit 138. Likewise, read-only-meory 128 is connected to A drive delay circuit 140 and D drive delay circuit 142. Likewise, read-only-memory 130 is connected to the input of B drive delay circuit 144 and C drive delay circuit 146. The outputs of the delay circuits 132, 134, 316, 138, 140, 142, 144 and 146 as well as the other fifty-six delay circuits not shown associated with each of the transistor power switching bridges not shown form the trigger signals for the transistor switches of each of the four arms of each transistor power switching bridge. These delay circuits are utilized to provide the delay previously discussed with respect to FIG. 4. More particularly, these delay circuits introduce the four microsecond delay, by way of example, introduced to ensure that the transistors of the switching bridges which permit conduction through the primary windings in opposite directions do not conduct at the same time. These delay circuits thus prevent the condition of the power switching bridges known as "shoot-through". Other "shoot-through" protection schemes, including transistor saturation sensing, could also be utilized within the scope of the present invention.

A current transformer 148 which may be a torroidal core transformer is used to sense the output current flowing to load 118. A full wave rectifier 150 is connected to the output of the current transformer 148 and furnishes its full wave rectified output to resistive scaler 152. The output of resistive scaler 152 is converted to digital format by means of analog to digital converter 154. The digital output of analog to digital converter 154 is furnished to comparator 156 which compares the output of analog to digital converter 154 with a fixed reference 158. This error signal e at the output of comparator 156 is furnished to an array of read-only-memories 160. The outputs of the array of read-only-memories 160 are furnished to a lead arithmetic logic unit 162 and simultaneously are furnished to a lag arithmetic logic unit 164. The outputs of the lead and lag arithmetic logic units 162 and 164, respectively, are furnished to lead counter 120 and lag counter 122, respectively.

Arithmetic logic unit 166 receives existing count information from both the lead counter 120 and the lag counter 122. The output of arithmetic logic 166 is provided to correlator 168 which provides shift strobe signals to the lead and lag counters 120 and 122. Correlator 168 also receives a fixed reference input that is equal to $2\phi_R$ where $2\phi_R=\phi_1+\phi_2$ and where $\phi_1$ equals the angular position of the lead sinusoid, $\phi_2$ equals the angular position of the lag sinusoid and $\phi_R$ equals the angular position of the resultant sinusoid. Finally, a digital source 170 of modulation information is connected to the inputs of the lead and lag arithmetic logic units 162 and 164.

Figure 6:
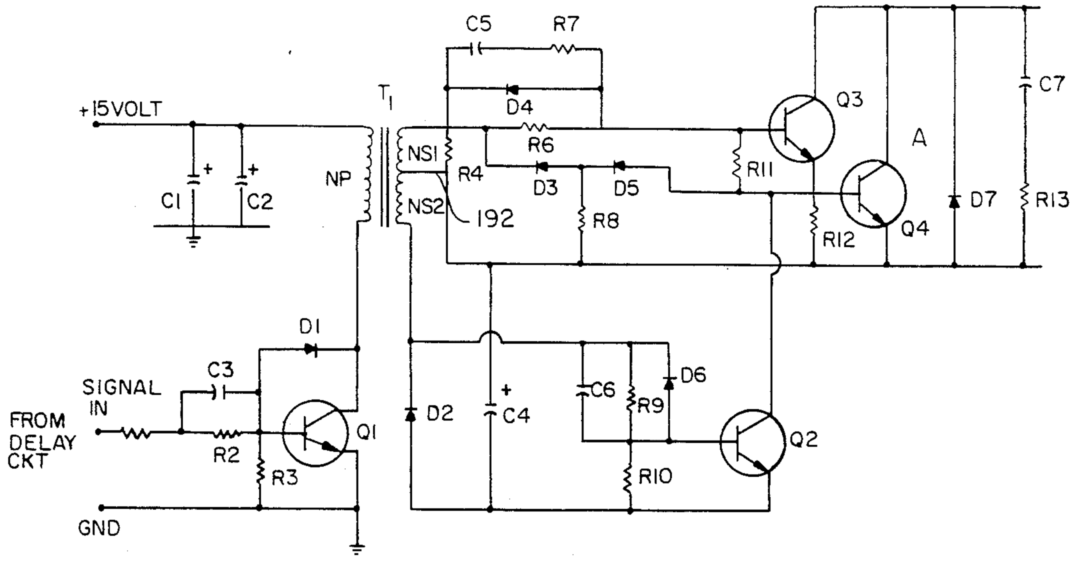
FIG. 6 is a network schematic diagram of a base drive circuit utilized in each of the four arms of the transistor switching power amplifier bridges of the present invention.
Figure 7:
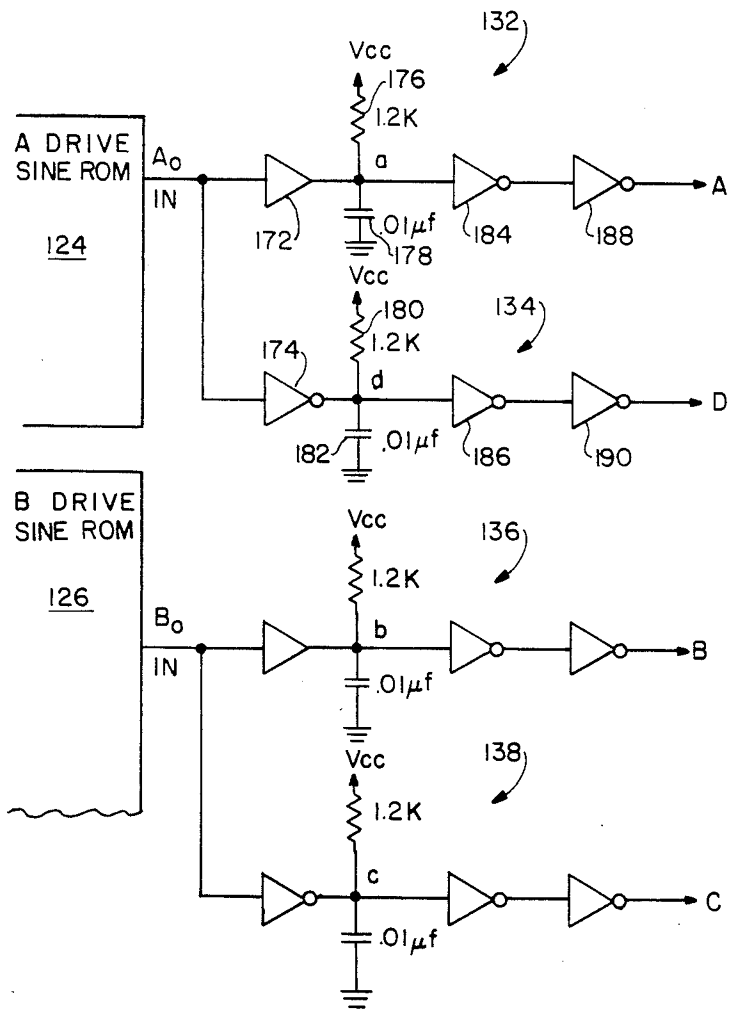
FIG. 7 is a schematic network diagram of the time delay networks utilized in accordance with the present invention.

Referring now to FIG. 7, the delay circuits 132 and 134 will be described, it being understood that the delay circuits 136 and 138 are, respectively, identical to 132 and 134. It is also understood at this point that delay circuits 140 and 144 are identical to delay circuit 132 and delay circuits 142 and 146 are identical to delay circuits 134 and 138. The output of the A drive sine ROM 124 is connected to a pair of open collector buffer networks, a non-inverting open collector buffer 172 and an inverting open collector buffer 174. These may be implemented as model 7407's and 7406's, respectively. The outputs of both buffers are connected to a four microsecond (by way of example) RC network including resistor 176 connected to voltage supply $V_{cc}$ and capacitor 178 connected to the output of buffer 172 and to ground. Similarly, resistor 180 is connected between the voltage supply $V_{cc}$ and the output of buffer 174 and capacitor 182 is connected between the output of buffer 174 and ground as illustrated. The outputs of the buffer networks 172 and 174 are also connected, respectively, to Schmitt-trigger inverters 184 and 186. The Schmitt-trigger inverters may be implemented as model 7414 inverters. The outputs of the Schmitt-triggers 184 and 186 are then connected to buffer inverters 188 and 190, respectively, which drive the base drive circuits illustrated in more detail in FIG. 6. The buffer inverters 188 and 190 may be implemented as model 74LS240 bufferin inverters.

These delay circuits operate as follows. When signal $A_o$ from read-only-memory 124 goes low, the output transistor in the buffer network 172 goes into saturation, shorting the capacitor 178 to ground. The output of the Schmitt-trigger 184 goes high and the inverted output of inverter 188 is driven low. Thus, the falling edge of output pulse A is synchronous with the falling edge of signal $A_o$ within the propagation delay of the three buffers 172, 184 and 188 and the discharge of capacitor 178 through the open collector transistor of buffer 172.

Figure 8:
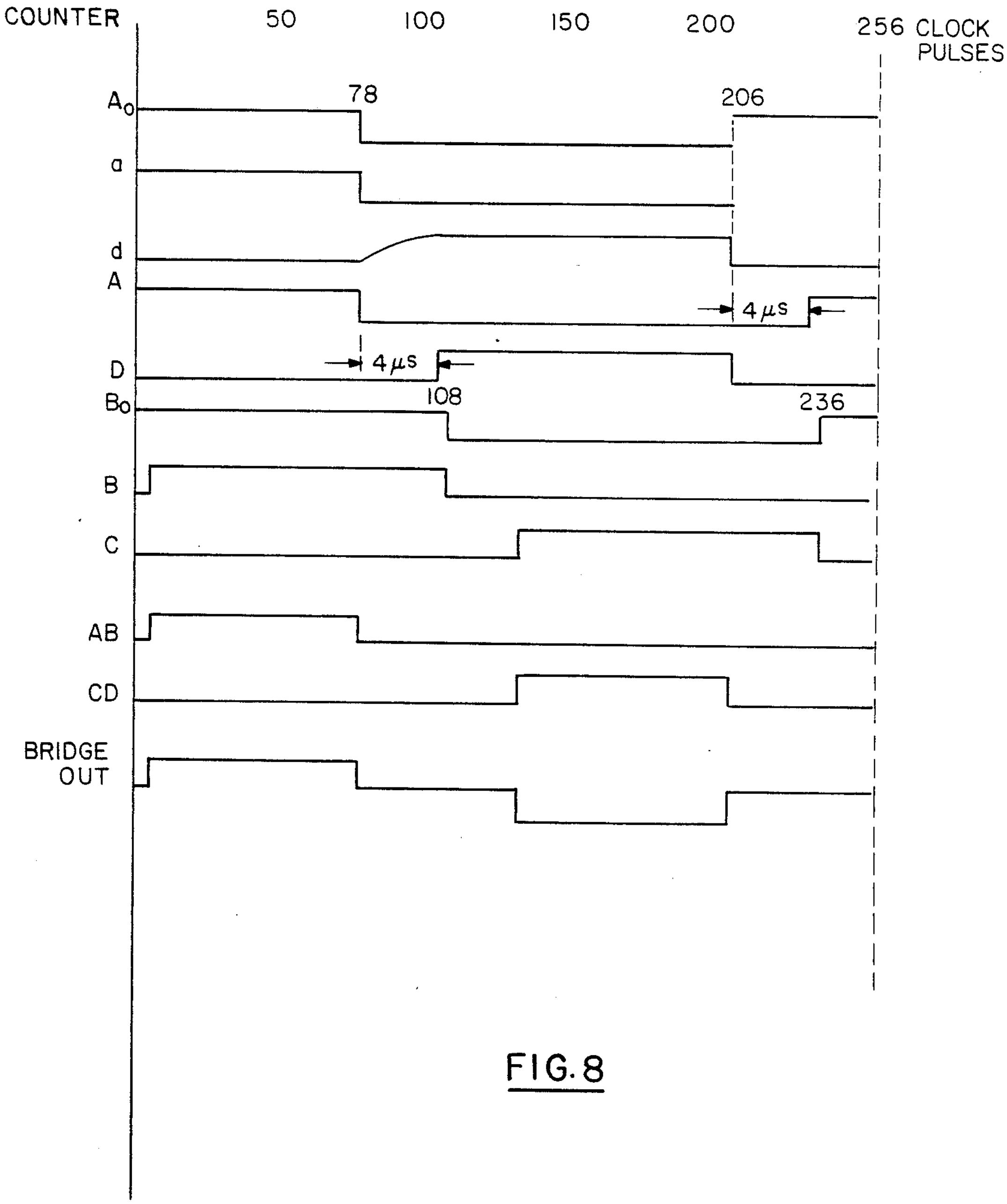
FIG. 8 is a timing diagram illustrating the waveforms and their time relationship of the component parts of the time delay network illustrated in FIG. 7.

During this transition the output transistor in inverter 174 is cut-off, allowing the capacitor to charge exponentially towards the voltage $V_{cc}$. It takes four microseconds, in the present example, for the charge to reach 1.7 volts, the upper trigger threshold of the Schmitt-trigger, in the present example, at which time the Schmitt-trigger 186 output drops to zero. Simultaneously the D output of the bottom inverter driver 190 goes high. Thus, it can be seen that the positive going edge of signal D trails the falling edge of signal A by four microseconds (in this example) which is the desired delay between these two signals. Subsequently, when signal $A_o$ goes high, the positive going edge of signal A is delayed by four microseconds, whereas the negative going edge of signal D undergoes only the propagation delay of the three buffers 174, 186 and 190. Again, it should be clear that the rising edge of signal A lags the falling edge of signal D by the required delay time. The timing of the signals referred to with respect to FIG. 7 is illustrated in the timing diagram of FIG. 8 wherein it is also noted that the clock pulse number at which the various transistions illustrated in FIG. 8 occur have been indicated by way of example.

Referring now to FIG. 6, there is illustrated the preferred embodiment of one arm of one of the transistor switching bridges utilized in the present invention, it being understood that each of the four arms of each transistor switching bridge utilized in the present invention would have an identical base drive circuit as that illustrated in FIG. 6 and now described. Each base drive circuit has an input transistor Q1 implemented as an NPN transistor. The input signal is derived through resistors R1, R2 and R3. Capacitor C3 is connected across resistor R2 and diode D1 is connected as illustrated across the base and collector of transistor Q1. The emitter of transistor Q1 is connected to ground. A positive voltage supply such as a fifteen volt supply is connected to the input winding NP of transformer $T_1$. Shunt capacitors C1 and C2 are connected between the fifteen volt supply and ground as illustrated. The secondary windings of transformer $T_1$ are divided by center tap 192 such that there is a first secondary winding NS1 and a second secondary winding NS2. Resistor R4 is connected across winding portion NS1 as illustrated. Resistor R6, diode D4, capacitor C5 and resistor R7 as well as resistor R8, diode D3, diode D5, resistor R11 and resistor R12 are connected as illustrated. Darlington NPN transistor pair Q3 and Q4 have their base-emitter terminals connected across the resistors R11 and R12 as illustrated. It is noted at this point that NPN transistor Q4, the output transistor of base drive circuit, corresponds to the transistors actually depicted in the transistor switching bridge in FIG. 5, i.e., transistor Q4 corresponds, for instance, to transistor A of switching bridge 44. A diode D7 is connected across the emitter-collector terminals of output transistor Q4 and resistor R13 and capacitor C7 are connected across diode D7. The bottom terminal of secondary winding portion NS2 of transformer $T_1$ is connected to the cathode of diode D2. The anode of diode D2 is connected to capacitor C4 which has its other terminal connected to the center tap 192. The cathode of diode D2 is likewise connected to the parallel combination of capacitor C6, resistor R9, and diode D6. The base-emitter junction of transistor Q2 is connected across resistor R10 as illustrated and the collector of transistor Q2 is connected to the base of Darlington output transistor Q4.

The Darlington configuration illustrated in FIG. 6 is used for several reasons. First, the base circuit losses are reduced as compared with single transistor configurations. Second, because of the action of the inner transistor Q3, the outer transistor Q4 is prevented from being overdriven, which reduces the transistor storage time and alleviates the problem associated with flux unbalancing of the main power transformer used in the inverter. Transistor Q3 may be overdriven at light load, but the power rating of transistor Q3 is much smaller than that of transistor Q4, and therefore the storage time of transistor Q3 is less significant. Base drive transformer $T_1$ provides three functions: conductive isolation, base drive current during the on time of the Darlington transistors Q3 and Q4, and flyback action to provide reverse bias to the power Darlington transistors during the off time.

The operation of the base drive circuit illustrated in FIG. 6 is as follows. When transistor Q1 is turned on, the fifteen volts of the voltage supply is applied across the primary winding NP of transformer $T_1$ thereby inducing a five voltage drop across each of secondary windings NS1 and NS2 because of the 3:1 step-down ratio utilized. The secondary winding NS1 provides the necessary base drive to the power Darlington transistors Q3 and Q4 and winding NS2 charges up capacitor C4 through diode D2. The capacitor charge in capacitors C4 is used to speed up the turn-off of transistor Q4 at the instance of turn-off. Capacitors C3, C5, and C6 are used for speeding up the turn-on of the transistors. Darlington base resistors R11 and R12 are added to reduce the overall gain of the Darlington transistor pair to avoid the possibility of false triggering of the Darlington transistors. Also, resistors R11 and R12 provide a path for diverting noise signals from the base of the Darlington transistors to avoid false triggering. Transistor Q2 is cutoff during this period because of reverse bias of the base terminal by the forward voltage drop of diode D2.

When transistor Q1 is turned off, the energy stored in transformer T1 is released through several paths. One path including winding NS2, capacitor C6, the base-emitter junction of transistor Q2 and capacitor C4 functions to turn on transistor Q2 so that the base-emitter junction of transistor Q4 is reversed biased by the voltage across capacitor C4 which speeds up the sweep out of minority charge in transistor Q4 to rapidly turn off transistor Q4. Another path sweeps out the minority charge in transistors Q3 and Q4. Diodes D3 and D5 are used to provide a discharge path for the base-emitter junction of transistor Q4 in case transistor Q3 has already been reversed biased. The combined forward voltage drop of diodes D3 and D5 also ensure that the base-emitter junction of transistor Q3 is adequately reversed biased. Resistors R4 and R8 are used for shaping the waveform of the voltage across the transformer $T_1$ secondary windings NS1 and NS2. The values of resistors R4 and R8 are chosen such that a reverse bias voltage to the power transistor exists for the entire off period. Diode D4 is used for speeding up the turn off of the Darlington output transistor pair. Diode D6 is used for the same purpose for transistor Q2.

Figure 9:
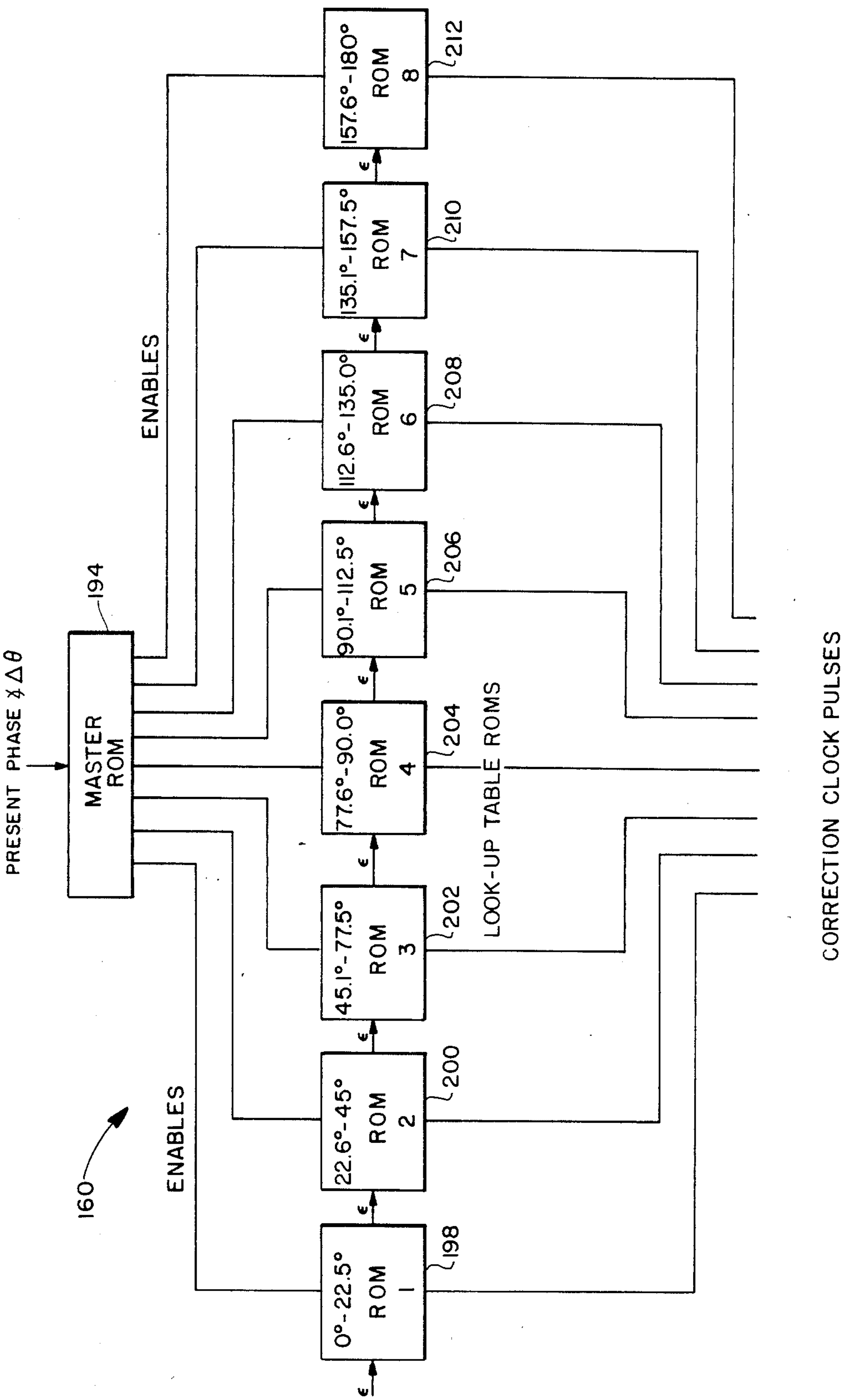
FIG. 9 is a schematic network diagram of the feedback algorithm read-only-memory utilized in the present invention.

Referring now to FIG. 9, there is illustrated an implementation of the array of feedback algorithm read-only-memories 160. Read-only-memories 160 may be implemented by a master ROM 194 which receives its input from arithmetic logic unit 196 shown in FIG. 5. It is noted at this point that arithmetic logic unit 196 receives inputs from the lead and lag counters 120 and 122 to generate an output that represents the phase difference, $\Delta\theta$, between the lead and lag sinusoids. This present phase angle difference, $\Delta\theta$, serves as an address to master ROM 194. The master ROM 194 selects one of the look-up table read-only-memories 198, 200, 202, 204, 206, 208, 210, or 212. Each of the read-only-memories 198, 200, 202, 204, 206, 208, 210, and 212 receives as an input the error signal e generated by comparator 156. The master ROM 194 selects the appropriate look-up table ROM according to the present phase angle between the lead and lag sinusoids. In the present example there are 64 possible phase angles with 256 address ROMs and moving the lead and lag phases a minimum of one clock pulse each. It is understood at this point that to make an exact correction in present example, 64 look-read-only-memories could be used. However, for simplicity in the hardware, the phase angles $\Delta\theta$ have been grouped into eight bands. Thus, depending upon which band of phase angles the present phase angle $\Delta\theta$ is in, master ROM 194 will enable one of the look-up table ROMs 198 through 212. Once enabled by master ROM 194, the particular look-up table ROM will generate a phase angle correction value to be furnished to the lead and lag arithmetic logic units 162 and 164.

Referring now again to FIG. 5, the operation of the present invention will be described. It should be understood at this point that the lead phase secondary windings 58, 62, 64, 66, 68, 70, 72, and 74 will generate a first stepped sinusoidal voltage waveform across terminals 76 and 78 and that the lag phase secondaries 82, 84, 86, 88, 90, 92, 94, and 96 will generate a second stepped sinusoidal voltage waveform between terminals 78 and 98 to result in a sum sinusoidal waveform which may be derived across terminals 76 and 98. The sinusoidal waveform developed by the lead phase secondaries is identical to the sinusoidal waveform developed by the lag phase secondaries but may or may not be intentionally phase shifted from the lead phase sinusoid depending upon the particular operating mode desired. When the clock pulse train generated by clock generator 116 is initiated, both the lead counter 120 and the lag counter 122 generate binary counts at their outputs. These binary counts are used as the addresses of the read-only-memories 124, 126, 128, and 130 in the lead and lag phases. Each of the read-only-memories has programmed in it the switch drive information required to accomplish the turn-on and turn-off of the switching transistors of each of the lead and lag phase transistor switching bridges in order to generate the rectangular pulse sequences V01 through V08. It should be understood that a particular clock count from either the lead or lag counter 120 or 122 will correspond to a particular phase angle of the lead and lag phase sinusoids. Thus, for instance, the A drive sine ROM 124 will be programmed to provide the trigger signals, through the delay circuits 132 and 134, necessary to cause transistor switching bridge 44 to generate an output pulse sequence such as pulse sequence V01 illustrated in FIG. 3. Similarly, the A and B drive sine ROMs 128 and 130 in the lag phase of the present invention are programmed to generate the necessary trigger signals required to turn on and turn off the switching transistors of the lag phase switching bridge at the appropriate times to generate alternating sequences of positive and negative voltage pulses as illustrated in FIG. 3. As an example, actual clock pulse counts suitable for use in the present invention are illustrated in FIG. 3. The ouptuts of each of the read-only-memories 124, 126, 128, 130 as well as the read-only-memories not shown thus dictate the time of occurrence of each base drive signal of each transistor in each transistor switching bridge. It is noted at this point that the sequences of positive and negative voltage pulses produced by each transistor switching bridge across its corresponding transformer winding is slightly phase shifted with respect to the sequence of voltage pulses produced by every other transistor switching bridge. This can be made more clear by reference to FIG. 3 wherein it is seen that, for instance, rectangular pulse sequence V05 has the leading edge of its first positive rectangular pulse occurring twenty-five clock pulses from the reference zero point and that, for instance, the rectangular pulse sequence V06 has the leading edge of the first positive rectangular pulse occurring thirty-two clock pulses from the zero reference point. Thus, it should be appreciated that there is developed across terminal 76 and 78 a lead phase stepped sinusoid and developed across terminals 78 and 98 is a lag phase stepped sinusoid. By connecting the lead and lag phase secondary windings and series with each other, the two sinusoids are summed and a resultant sinusoid is created.

In accordance with the present invention, it may be desired to ensure that the phase and/or amplitude of the resultant sinusoid does not deviate from afixed reference. Thus, provision is made in the present invention to shift the phase angle of the resultant sinusoid. As far as each individual transistor switching bridge is concerned, in order to accomplish this phase shift, it can be envisioned that this phase shift might require jumping from, for example, point y to point x as illustrated in FIG. 4. In this situation it can be seen that transistor A is on before the phase shift, and one clock pulse later, transistor D is triggered to turn on. This results in the situation that transistor D turns on before transistor A can turn off and a short circuit path through transistors A and D occurs. To prevent this "shoot-through" situation, the base drive signals for the switching transistors of the transistor switching bridges are directed through the delay circuits 132, 134, 136, etc., previously described. The delay circuits thus prevent "shoot-through".

In order to accomplish a phase and/or an amplitude change of the resultant sinusoid, current transformer 148 is utilized to sense the output current amplitude and compare it to a reference. If there is a difference between the output current amplitude and the established reference, the function of the feedback loop including rectifier 150, scaler 152, analog to digital converter 154, comparator 156 and the feedback algorithm ROMs 160 is to make the appropriate correction in changing the relative phase angle between the lead and lag sinusoids to reduce the error to zero. Thus, the output current is full wave rectified via rectifier 150 and then is appropriately scaled by resistive scaler 152. This value at the output of scaler 152 is converted to a digital quantity by means of the analog to digital converter 154. Comparator 156 compares this digital scaled output current amplitude with the fixed reference 158 to generate an error signal e. The amount of correction to be made is dependent upon the relative phase angle between the lead and lag sinusoids, i.e., the amount of correction or phase angle change required is operating point dependent because changing the relative phase angle between the lead and lag sinusoids produces a greater change in the phase and/or amplitude of the resultant sinusoid when the lead and lag sinusoids relative phase angle is great as compared to the case where the lead and lag sinusoids relative phase angle is small. Normally, without the inclusion of the feedback loop, the phase of each of the lead and lag sinusoids advances one clock pulse at a time. The effect of the feedback loop is to advance or retard the relative phase between the lead and lag sinusoids by a discrete number of clock pulses. Both lead and lag sinusoid phases are changed the same number of clock pulses by either adding a phase changed to the lead sinusoid and subtracting the same amount of phase angle from the lag sinusoid or visa versa. By so changing the phase of the lead and lag sinusoids by the same number of clock pulses, the phase of the resultant sinusoid then remains the same. By changing the lead and lag phases by a different amount of clock pulses, the phase of the resultant sinusoid can be shifted.

In order to determine the number of clock pulses required to correct the output sinusoid, in accordance with the present invention read-only-memory look-ups are utilized. By changing the lead and lag sinusoid phases by a minimum of one clock pulse, there are sixty-four relative phase angles possible to 256 address read-only-memories. This corresponds to phase angles from zero degrees to 180° apart. In the present example, each clock pulse thus represents a phase change of 1.4°. Thus, if the lead and lag sinusoids are to be shifted by an equal amount in order to maintain the phase of the resultant sinusoid, each change of one clock pulse results in a change of relative phase between the lead and lag sinusoids of 2.8°.

The number of clock pulses to be added or subtracted from the existing count of the lead and lag counters 120 and 128 is calculated in the following way. Referring to FIG. 9, arithmetic logic unit 196 receives the existing count from both the lead counter 120 and the lag counter 122. These counts, of course, correspond to a particular phase. The arithmetic logic unit 196 subtracts the count of the lag counter 122 from the count of the lead counter 120 to generate the quantity $\Delta\theta$ representing the relative phase relationship between the lead and lag sinusoids. This relative present phase angle $\Delta\theta$ provided as an input to master ROM 194. Master ROM 194 utilizes the value $\Delta\theta$ as an address to determine which of the eight look-up table read-only-memories 198, 200, 202, 204, 206, 208, 210 and 212 to enable. If $\Delta\theta$ is between zero and 22.5°, for instance, then read-only-memory 198 is enabled. If, as another example, the present phase angle between lead and lag sinusoids, $\Delta\theta$, is 180° than the read-only-memory 212 will be enabled. It should be understood that an exact correction could be achieved through utilization of sixty-four look-up read-only-memories instead of the "band" approached utilized for simplicity. Each look-up ROM contains the number of clock pulses necessary to make the required correction as a function for existing error $\epsilon$. The error $\epsilon$ is then a digital input to the look-up table read-only-memories previously discussed.

The digital word appearing at the output of the feedback algorithm read-only-memories 166 representing the amount of phase angle each of the lead and lag sinusoids should change is transmitted to the lead and lag arithmetic logic units 162 and 164, respectively. The digital phase angle correction amount word includes a sign bit indicating whether the lead and lag phase angles should close or open with respect to each other. The arithmetic logic units 162 and 164 are designed to perform the opposite functions of each other, i. e., if the phase shift angle word sign bit is positive, the lead sinusoid arithmetic logic unit 162 will add the amount of correction by adding to the existing count the required number of clock pulses to achieve the desired phase shift and the lag arithmetic logic 164 will subtract the phase angle correction amount from the existing count.

As seen in FIG. 5, the existing count of each of the lead and lag counters 120 and 122 is fed back to its respective arithmetic logic unit 162 and 164 to perform the correct phase change. The feedback existing count to which the correction amount is either added or subtracted, gives rise to the new count required for the relative phase angles of the lead and lag sinusoids to be correctly repositioned. This new count is parallel pumped into the respective counters 120 and 122 on the occurrence of the shift strobe from correlator 168 to be described.

The number of times per sinusoid that amplitude correction is executed is dependent upon the requirements of the application of the present invention. By way of example, in the preferred embodiment of the present invention, sampling of the lead and lag sinusoids has been performed at the negative and positive peaks of the sinusoids and the correction is applied during the following clock pulse. It should be understood though that the correction could also be applied at the zero crossing from the error data generated while the sinusoid was at its peak. Likewise, continual error correction could also be accomplished throughout the sinusoid by application of a reference sinusoid at the input to comparator 156 as opposed to the fixed reference described earlier.

Since both the lead and lag sinusoids are rotating and the output sinusoid is the vectorial sum of them, the exact location of the vectorial sum can be determined from the location of the individual sinusoids. Thus, where $\phi_1$ is defined as the angular position of the lead sinusoid and $\theta_2$ is defined as the angular position of the lag sinusoid and $\theta_R$ is defined as the angular position of the resultant sinusoid, then $2\phi_R=\phi_1+\phi_2$. Due to the fact that amplitude correction is applied twice per sinusoid, the value $2\phi_R$ is the desired output word of correlator 168. Therefore, correlation circuit 168 comprising exclusive OR gates is used to compare the fixed reference value $2\phi_R$ with the varying output of the arithmetic logic unit 166. Arithmetic logic unit 166 receives the existing count from the lead and lag counters 120 and 122 to provide an output that is equal to $\phi_1+\phi_2$. Correlator 168 then compares the output of the arithmetic logic unit 166 with the value $2\phi_R$ which is set at the clock count occurring at the peak value of the output sinusoid which is the desired output amplitude. Thus, the output of correlator 168 is used as a strobe to execute correction of the phase angles of the lead and lag sinusoid by parallel loading the lead and lag counters 120 and 122 at the appropriate time.

In order to achieve phase/amplitude modulation of the output resultant sinusoid, modulation index network 170 is provided modiuation index 170 may be implemented as a digital computer. Thus, modulation index network 170 can output a sequence of binary modulation words which are used to add or subtract a number of correction clock pulses to the lead and lag counters 120 and 122 via the lead and lag arithmetic logic units 162 and 164, respectively.

Obviously, many other modifications and variations of the present invention are possible in the light of the above teachings. It is therefore to be understood that within the scope of the appended claims the invention may be practiced otherwise than as specifically described.

What is claimed is:

1. A method of generating a stepped sinusodial waveform having a positive half cycle and a negative half cycle by approximation by summing a plurality of rectangular pulses, each said rectangular pulse having a leading edge and a trailing edge comprising the steps of:

(a) generating a set of n successive positive rectangular pulse, each of said pulses having an equal amplitude and each of said pulses having a different phase shift with respect to a reference, the trailing edge of the nth one of said positive rectangular pulses being the nth down-step of said positive half cycle of said sinusodial waveform, where n is a positive integer greater than 1;

(b) generating a set of n successive negative rectangular pulses, each of said n successive negative pulses having an equal amplitude and each of said negative pulses having a different phase shift with respect to a reference, the trailing edge of the $n^{th}$ one of said negative pulses being the $n^{th}$ up-step of said negative half cycle of said sinusodial waveform:

(c) adding each of said n positive pulses and each of said n negative pulses to obtain said sinusodial waveform.

2. The method of claim 1 wherein each $n^{th}$ positive pulse has a duration that is equal to the duration of the corresponding $n^{th}$ negative pulse.

3. The method of claims 1 or 2 wherein each of said n positive pulses is a voltage pulse formed across one of n primary coils of n transformers and each of said negative pulses is a voltage pulse formed across a corresponding one of said n primary coils.

4. A transistor drive network comprising:

an input transistor having a base, emitter and collector;

a transformer having a primary winding connected in series with the emitter-collector path of said input transistor and having a secondary winding;

a voltage supply connected across said transformer's primary winding;

a capacitor connected across a first portion of said secondary winding;

a Darlington transistor pair having an inner and an outer transistor, said inner transistor having an input connected across a second portion of said secondary winding;

transistor means connected to said capacitor and to said outer transistor for reverse-biasing said outer transistor in response to turn-off of said input transistor.

5. A network comprising:

an input terminal;

a non-inverting open collector buffer connected to said input terminal;

an inverting open collector buffer connected to said input terminal;

a first capacitor having first and second terminals and having its first terminal connected to the output of said non-inverting open collector buffer and having its second terminal connected to ground;

a second capacitor having first and second terminals and having its first terminal connected to the output of said inverting open collector buffer and having its second terminal connected to ground;

a first Schmitt-trigger buffer connected to said non-inverting open collector buffer;

a second Schmitt-trigger buffer connected to said inverting open collector buffer; and first and second buffer inverters connected respectively to said first and second Schmitt-trigger buffers.

6. A method of controlling the amplitude of a sinusodial type waveform comprising the steps of:

(a) generating a first sinusoid having a positive half cycle and a negative half cycle with the method comprising the steps of:

generating a first set of n successive positive rectangular pulses, where n is a positive integer greater than 1, each of said pulses having an equal amplitude and each of said pulses having a different phase shift with respect to a reference, the tailing edge of the $n^{th}$ one of said positive rectangular pulses being the $n^{th}$ down-step of said positive half cycle of said first sinusoid, where n is a positive integer;

generating a first set of n successive negative rectangular pulses, each of said n successive negative pulses having an equal amplitude and each of said negative pulses having a different phase shift with respect to a reference, the trailing edge of the $n^{th}$ one of said negative pulses being the $n^{th}$ up-step of said negative half cycle of said first sinusoid;

adding each of said n positive pulses of said first set of n succesive positive rectangular pulses and each of said n negative pulses of said first set of n successive negative rectangular pulses to obtain said first sinusoid;

(b) generating a second sinusoid having a positive half cycle and a negative half cycle by the method comprising the steps of:

generating a second set of n successive positive rectangular pulses, each of said pulses having an equal ampitude and each of said pulses having a different phase shift with respect to a reference, the trailing edge of the $n^{th}$ one of said positive rectangular pulses being the $n^{th}$ down-step of said positive half cycle of said second sinusoid, wheren is a positive integer;

generating a second set of n successive negative rectangular pulses, each of said n successive negative pulses having an equal amplitude and each of said negative pulses having a different phases shift with respect to a reference, the trailing edge of the $n^{th}$ one of said negative pulses being the $n^{th}$ up-step of said negative half cycle of said second sinusoid;

adding each of said n positive pulses of said second set of n succesive positive rectangular pulses and each of said n negative pulse of said second set of n successive negative rectangular pulses to obtain said second sinusoid;

(c) adding said first sinusoid to said second sinusoid to obtain a sum sinusoid; and (d) selectively varying the phase shift between said first and second sinusoids to thereby control the ampitude of said sum sinusoid.

7. In a network including n switching means where n is a positive integer, each having an input and an output, each having a non-conducting output condition and a conducting output condition and each for switching from said non-conducting condition to said conducting condition in response to receipt of a trigger signal at said input, and further including n transformers, each of said n transformers having a primary winding and a secondary winding, the primary winding of each of said n transformers being connected to said output of a different one of said n switching means, said secondary windings being connected in series, the improvement comprising:

a digital network operably coupled to the inputs of said n switching means, said digital network including read-only-memory means operably coupled to said n switching means for providing digital input signals to said n switching means.

8. The network of claim 7 wherein said digital network further comprises:

a clock signal generator;

a counter coupled to said clock signal generator, the output of said counter being connected to said read-only-memory means.

9. The network of claim 8 further comprising: delay circuit means coupled to the output of said read-only-memory means for providing at least one output trigger signal and at least one delayed output trigger signal to each of said switching means.

10. The network of claim 9 wherein:

said read-only-memory means comprises a first set of n read-only-memories connected to said counter and a second set of n read-only-memories connected to said counter.

11. The network of claim 10 wherein said delay circuit means comprises:

a first set of n delay circuits each being connected to one of said n read-only-memories of said first set of n read-only-memories; and a second set of n delay circuits each being connected to one of said n read-only-memories of said first set of n read-only-memories;

a third set of n delay circuits each being connected to one of said n read-only memories of said second set of read-only-memories; and a fourth set of n delay circuits each being connected to one of said n read-only-memories of said second set of read-only-memories.

12. The network of claim 11 wherein each of said n delay circuits of said first set of n delay circuits and each of said n delay circuits of said third set of n delay circuits comprises:

a buffer amplifier;

an inverting network connected to the output of said buffer amplifier;

a shunt capacitor connected between said buffer amplifier and said inverting network; and an inverting buffer network connected to the output of said inverting network.

13. The network of claims 11 or 12 wherein each of said n delay circuits of said second and fourth sets of n delay circuits comprises:

an inverting buffer amplifier;

an inverting network connected to the output of said buffer amplifier;

a shunt capacitor connected between said buffer amplifier and said inverting network; and an inverting buffer network connected to the output of said inverting network.

14. The network of claim 13 wherein:

each of said inverting networks connected to the output of said buffer amplifiers comprises a Schmitt-trigger inverter.

15. The network of claim 12 wherein:

each of said inverting networks connected to the output of said buffer amplifiers comprises a Schmitt-trigger inverter.

16. A network comprising:

a first set of n switching mean where n is a positive integer, each having an input and an output, each having a non-conducting output condition and a conducting output condition and each for switching from said non-conducting condition to said conducting condition in response to receipt of a trigger signal at said input and further including n transformers, each of said n transformers having a primary winding and a secondary winding, the primary winding of each of said n transformers being connected to said output of a different one of said n switching means, said secondary windings being connected in series;

a second set of n switching means, each having an input and an output, each having a non-conducting output condition and a conducting output condition and each for switching from said non-conducting condition to said conducting condition in response to receipt of a trigger signal at said input and further including n transformers, each of said n transformers having a primary winding and a secondary winding, the primary winding of each of said n transformers being connected to said output of a different one of said n switching means, said secondary windings being connected in series;

said series connection of secondary windings associated with said first set of n switching means being connected in series with said series connection of secondary windings associated with said second set of n switching means;

first digital network means operably coupled to the inputs of said first set of n switching means for providing trigger signals to said n switching means;

second digital network means operably coupled to the inputs of said second set of n switching means for providing trigger signals to said n switching means.

17. The network of claim 16 further comprising:

a clock signal generator operably connected to said first and second digital network means.

18. The network of claim 17 further comprising:

means connected to said first and second digital network means for varying the phase angle between the output signal developed across said secondary windings associated with said first set of n switching means from the phase angle of the output signal developed across said secondary windings associated with said second set of n switching means.

19. The network of claim 18 wherein said phase angle varying means comprises:

feedback means operably coupled to said series connected transformer secondary windings and to said first and second digital network means.

20. The network of claim 19 wherein said feedback means comprises:

means for sensing the current through said secondary windings; and means operably coupled to said sensing means for comparing the value of current sensed by said sensing means with a reference value and for generating an error signal equal to the difference between said sensed value and said reference value.

21. The network of claim 20 wherein said comparing means comprises:

a rectifier connected to said sensing means;

a scaler connected to said rectifier;

an analog-to-digital converter connected to said scaler; and a comparator network connected to said analog-to-digital converter.

22. The network of claim 21 wherein:

each of said n switching means comprises a four-armed transistor switching bridge.

23. The network of claim 22 wherein said first and second digital network means each comprise:

a counter;

first and second sets of n read-only-memories connected to said counter; and a first and second delay network connected to each of said n read-only-memories.

24. The network of claim 23 further comprising: means connected to said comparator network and to each counter for converting said error signal to first and second binary count values and for enabling at a predetermined time and shifting of the count of said first digital network counter to said first binary count value and for enabling at said predetermined time the shifting of the count of said second digital network counter to said second binary count value.

25. The network of claim 24 wherein said means for converting and enabling comprises:

an array of read-only-memories connected to the output of said comparator network;

a first arithmetic logic unit connected to said array and to said first digital network counter; and a second arithmetic logic unit connected to said array and to said second digital network counter.

26. The network of claim 25 wherein said converting and enabling means further comprises:

a third arithmetic logic unit having an input connected to the outputs of each of said first and second digital logic network counters; and a correlator connected to the output of said third arithmetic logic unit and to each of said first and second digital logic network counters.

27. The network of claim 26 further comprising:

a fourth arithmetic logic unit having inputs coupled to the outputs of each of said first and second digital logic network counters and having an output connected to said array of read-only-memories.

28. The network of claims 7 or 16 wherein each of said n switching means comprises:

a four-arm transistor switching bridge.

29. The network of claim 28 wherein each arm of said four-arm transistor switching bridges comprises:

an input transistor having a base, emitter and collector;

a transformer having a primary winding connected in series with the emitter-collector path of said input transistor and having a secondary winding;

a voltage supply connected across said transformer's primary winding;

a capacitor connected across a first portion of said secondary winding;

a Darlington transistor configuration having an inner and an outer transistor, said inner transistor having an input connected across a second portion of said secondary winding;

transistor means connected to said capacitor and to said outer transistor for reverse-biasing said outer transistor in response to turn-off of said input transistor.

* * * * *